(12) United States Patent
Gates et al.

(10) Patent No.: US 10,579,794 B1
(45) Date of Patent: Mar. 3, 2020

(54) SECURING A NETWORK DEVICE BY AUTOMATICALLY IDENTIFYING FILES BELONGING TO AN APPLICATION

(71) Applicant: SYMANTEC CORPORATION, Mountain View, CA (US)

(72) Inventors: Christopher Gates, Marina Del rey, CA (US); Kyle Soska, Pittsburgh, PA (US); Kevin Alejandro Roundy, El Segundo, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 409 days.

(21) Appl. No.: 15/633,245

(22) Filed: Jun. 26, 2017

(51) Int. Cl.
| G06F 21/56 | (2013.01) |
| G06F 21/55 | (2013.01) |
| G06F 3/06 | (2006.01) |
| H04L 29/06 | (2006.01) |
| H04L 9/32 | (2006.01) |
| H04L 29/08 | (2006.01) |

(52) U.S. Cl.
CPC .......... *G06F 21/552* (2013.01); *G06F 3/0604* (2013.01); *G06F 3/0655* (2013.01); *G06F 21/56* (2013.01); *H04L 9/3236* (2013.01); *H04L 63/12* (2013.01); *H04L 63/14* (2013.01); *H04L 63/20* (2013.01); *H04L 67/1097* (2013.01)

(58) Field of Classification Search
CPC ....... H04L 63/12; H04L 63/14; H04L 9/3236; H04L 63/20; G06F 21/562; G06F 21/565; G06F 21/566; G06F 21/552
See application file for complete search history.

(56) References Cited

U.S. PATENT DOCUMENTS 9,185,119 B1 11/2015 Tamersoy et al.

OTHER PUBLICATIONS

23rd SIGKDD Conference on Knowledge Discovery and Data Mining webpage. Accessed on Jun. 27, 2017. http://www.kdd.org/kdd2017/papers/view/automatic-application-identification-from-billions-of-files.
Github, Inc., "Non-Metric Space Library (NMSLIB): A similarity search library and a toolkit for evaluation of k-NN methods for generic non-metric spaces" https://github.com/searchivarius/nmslib, accessed on Jun. 20, 2017.
Charu C Aggarwal, Jiawei Han, Jianyong Wang, and Philip S Yu. 2003. A framework for clustering evolving data streams. In Proceedings of the 29th international conference on Very large data bases-vol. 29. VLDB Endowment, 81-92.

(Continued)

*Primary Examiner* — Paul E Callahan
(74) *Attorney, Agent, or Firm* — Maschoff Brennan

(57) ABSTRACT

Securing a network device by automatically identifying files belonging to an application. In one embodiment, a method may include collecting file attributes for multiple files from multiple network devices, examining a hash of file contents of each of the multiple files to identify multiple unique files in the multiple files, summarizing the file attributes for each of the multiple unique files to generate a sketch of file attributes for each of the multiple unique files, clustering the multiple unique files into multiple applications, making a security action decision for one application of the multiple applications, and performing a security action on a network device based on the security action decision.

20 Claims, 4 Drawing Sheets

(56) References Cited

OTHER PUBLICATIONS

Noga Alon, Yossi Matias, and Mario Szegedy. 1996. Re space complexity of approximating the frequency moments. In Proceedings of the twenty-eighth annual ACM symposium on eory of computing. ACM, 20-29.

Arnab Bhattacharyya, Palash Dey, and David P Woodruff. 2016. An optimal algorithm for I1-heavy hitters in insertion streams and related problems. In Proceedings of the 35th ACM SIGMOD-SIGACT-SIGAI Symposium on Principles of Database Systems. ACM, 385-400.

Leonid Boytsov and Bilegsaikhan Naidan. 2013. Engineering effcient and effective non-metric space library. In International Conference on Similarity Search and Applications. Springer, 280-293.

Vladimir Braverman, Stephen R Chestnut, Nikita Ivkin, Jelani Nelson, David P. Woodruff, and Zhengyu Wang. 2016. BPTree: an heavy hitters algorithm using constant memory. arXiv preprint arXiv:1603.00759 (2016).

Vladimir Braverman, Stephen R Chestnut, Nikita Ivkin, and David P Woodruff. 2015. Beating CountSketch for heavy hitters in insertion streams. arXiv preprintarXiv:1511.00661 (2015).

Andrei Z. Broder. 1997. On the resemblance and containment of documents. In Proceedings of Compression and Complexity of Sequences. 21-29.

Feng Cao, Martin Ester, Weining Qian, and Aoying Zhou. 2006. Density-Based Clustering over an Evolving Data Stream with Noise. In SDM, vol. 6. SIAM, 328-339.

Moses Charikar, Kevin Chen, and Martin Farach-Colton. 2002. Finding frequent items in data streams. In International Colloquium on Automata, Languages, and Programming. Springer, 693-703.

Duen Horng Chau, Carey Nachenberg, Jeffrey Wilhelm, Adam Wright, and Christos Faloutsos. 2011. Polonium: Tera-scale graph mining and inference for malware detection. In Proceedings of the 2011 SIAM International Conference on Data Mining. SIAM, 131-142.

Lingwei Chen, William Hardy, Yanfang Ye, and Tao Li. 2015. Analyzing File-to-File Relation Network in Malware Detection. In International Conference on Web Information Systems Engineering (WISE).

Graham Cormode and Marios Hadjieleftheriou. 2008. Finding frequent items in data streams. Proceedings of the VLDB Endowment 1, 2 (2008), 1530-1541.

Graham Cormode and S Muthukrishnan. 2005. An improved data stream summary: the count-min sketch and its applications. Journal of Algorithms 55, 1 (2005), 58-75.

Wei Dong, Charikar Moses, and Kai Li. 2011. Effcient k-nearest neighbor graph construction for generic similarity measures. In Proceedings of the 20th international conference on World wide web. ACM, 577-586.

T. Dumitras. 2011. Field Data Available at Symantec Research Labs: Re Worldwide Intelligence Network Environment (WINE). In Proceedings of the ASPLOS Exascale Evaluation and Research Techniques Workshop.

Martin Ester, Hans-Peter Kriegel, Jorg Sander, Xiaowei Xu, and others. 1996. A density-based algorithm for discovering clusters in large spatial databases with noise. In Proceedings of the ACM SIGKDD international conference on Knowledge discovery and data mining (KDD), vol. 96. 226-231.

Piotr Indyk and Rajeev Motwani. 1998. Approximate nearest neighbors: towards removing the curse of dimensionality. In Proceedings of the thirtieth annual ACM symposium on theory of computing. ACM, 604-613.

Eyal Kushilevitz, Rafail Ostrovsky, and Yuval Rabani. 2000. Effcient search for approximate nearest neighbor in high dimensional spaces. SIAM J. Comput. 30, 2 (2000), 457-474.

Ting Liu, Charles Rosenberg, and Henry A Rowley. 2007. Clustering billions of images with large scale nearest neighbor search. In Applications of Computer Vision, 2007. WACV'07. IEEE Workshop on. IEEE, 28-28.

Yury Malkov, Alexander Ponomarenko, Andrey Logvinov, and Vladimir Krylov. 2014. Approximate nearest neighbor algorithm based on navigable small world graphs. Information Systems 45 (2014), 61-68.

Yu A Malkov and DA Yashunin. 2016. Effcient and robust approximate nearest neighbor search using Hierarchical Navigable SmallWorld graphs. arXiv preprint arXiv:1603.09320 (2016).

Ahmed Metwally, Divyakant Agrawal, and Amr El Abbadi. 2005. Effcient computation of frequent and top-k elements in data streams. In International Conference on Database Theory. Springer, 398-412.

Acar Tamersoy, Kevin Roundy, and Duen Horng Chau. 2014. Guilt by Association: Large Scale Malware Detection by Mining Filerelation Graphs. In Proceedings of the 20th ACM SIGKDD International Conference on Knowledge Discovery and Data Mining (KDD '14). ACM, New York, NY, USA, 1524-1533. DOI:hp://dx.doi.org/10.1145/2623330.2623342.

Thanh N Tran, Ron Wehrens, and Lutgarde MC Buydens. 2006. KNN-kernel density-based clustering for high-dimensional multivariate data. Computational Statistics & Data Analysis 51, 2 (2006), 513-525.

Jeffrey K Uhlmann. 1991. Satisfying general proximity/similarity queries with metric trees. Information processing letters 40, 4 (1991), 175-179.

David P Woodruff. 2016. New Algorithms for Heavy Hitters in Data Streams. arXiv preprint arXiv:1603.01733 (2016).

Yanfang Ye, Tao Li, Shenghuo Zhu, Weiwei Zhuang, Umesh Gupta Egemen Tas, and Melih Abdulhayoglu. 2011. Combining file content and file relations for cloud based malware detection. In Proceedings of the ACM SIGKDD international conference on Knowledge discovery and data mining (KDD).

Peter N Yianilos. 1993. Data structures and algorithms for nearest neighbor search in general metric spaces. In SODA, vol. 93. 311-21.

US 10,579,794 B1

SECURING A NETWORK DEVICE BY AUTOMATICALLY IDENTIFYING FILES BELONGING TO AN APPLICATION

BACKGROUND

Some network security applications function to detect malicious applications stored on network devices before the malicious applications can be executed or otherwise employed in damaging the network or network devices. Examples of malicious applications include applications that contain viruses or malware. While early malicious applications included only a single file, recent malicious applications, also known as malicious software packages, increasingly include multiple files. Further, recent malicious applications are increasingly released periodically as newer versions, with each version of the malicious application also including multiple files.

One problem with a malicious application including multiple files and multiple versions is the difficulty involved in identifying which files stored on a network device belong to the malicious application. Unless a network security application is able to identify all files belonging to a malicious application, it may be difficult for the network security application to fully protect a network device on which the malicious application is installed, which leaves the network device vulnerable to the malicious application.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for securing a network device by automatically identifying files belonging to an application may be performed, at least in part, by a computing device including at least one processor. The method may include collecting file attributes for multiple files from multiple network devices, examining a hash of file contents of each of the multiple files to identify multiple unique files in the multiple files, summarizing the file attributes for each of the multiple unique files to generate a sketch of file attributes for each of the multiple unique files, clustering the multiple unique files into multiple applications, making a security action decision for one application of the multiple applications, and performing a security action on a network device based on the security action decision.

In some embodiments, the file attributes may include one or more of a file name, a file path, a file signer, a file first seen date, a file size, file prevalence information, and file co-occurrence information. In some embodiments, the summarizing of the file attributes for each of the multiple unique files may include performing a count-min sketch on the file attributes of each of the multiple unique files. In some embodiments, the clustering of the multiple unique files into multiple applications may include determining a cosine similarity on sketches of the multiple unique files to cluster the multiple unique files into multiple applications. In some embodiments, the clustering of the multiple unique files into multiple applications may include performing minhashing on the sketches of the multiple unique files to cluster the multiple unique files into multiple applications. In some embodiments, the making of the security action decision may include making a decision that the one application is likely malicious. In some embodiments, the performing of the security action may include at least partially blocking the one application from sending data from the network device over a network.

Also, in some embodiments, the method may further include dividing the clustered unique files of the multiple applications into multiple versions of the multiple applications and the making of the security action decision for the one application of the multiple applications may include making a security action decision for one version of the multiple versions of the multiple applications. In some embodiments, the dividing of the clustered unique files of the multiple applications into the multiple versions of the multiple applications may include dividing the clustered unique files of the multiple applications into the multiple versions of the multiple applications based on a file first seen date of the clustered unique files.

Further, in some embodiments, one or more non-transitory computer-readable media may include one or more computer-readable instructions that, when executed by one or more processors, cause the one or more processors to perform a method for securing a network device by automatically identifying files belonging to an application.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Some embodiments in this disclosure relate to securing a network device by automatically identifying files belonging to an application.

Some network security applications function to detect malicious applications stored on network devices, such as applications that include viruses or malware, before the malicious applications can be executed or otherwise employed in damaging the network or network devices. However, because malicious applications increasingly include multiple files and are released periodically as multiple versions, it may be difficult for a network security application to identify which files stored on a network device belong to the malicious application. While a network security application may employ various conventional methods for determining which files belong to an application by analyzing a manifest, registry data, or an installer (e.g., to see what files are installed for an application), none of these conventional methods are acceptable in common situations faced by network security applications, such as when a request is received from a user to identify whether a particular file is part of a malicious application. Unless a network security application is able to identify all files belonging to a malicious application, it may be difficult for the network security application to fully protect a network device on which the malicious application is installed, which leaves the network device vulnerable to the malicious application.

The embodiments disclosed herein may enable the securing of a network device by automatically identifying files belonging to an application. In some embodiments, securing a network device by automatically identifying files belonging to an application may include collecting file attributes for multiple files from multiple network devices, examining a hash of file contents of each of the multiple files to identify multiple unique files in the multiple files, summarizing the file attributes for each of the multiple unique files to generate a sketch of file attributes for each of the multiple unique files, and clustering the multiple unique files into multiple applications. Then, a security decision and/or action may be performed on one application of the multiple applications, especially where the application is determined to be malicious. These embodiments may enable a network security application to identify all files belonging to a malicious application, thus enabling the network security application to deal with the files of the malicious applications collectively and more fully protect a network device on which the malicious application is installed, which leaves the network device less vulnerable to the malicious application.

Figure 1:
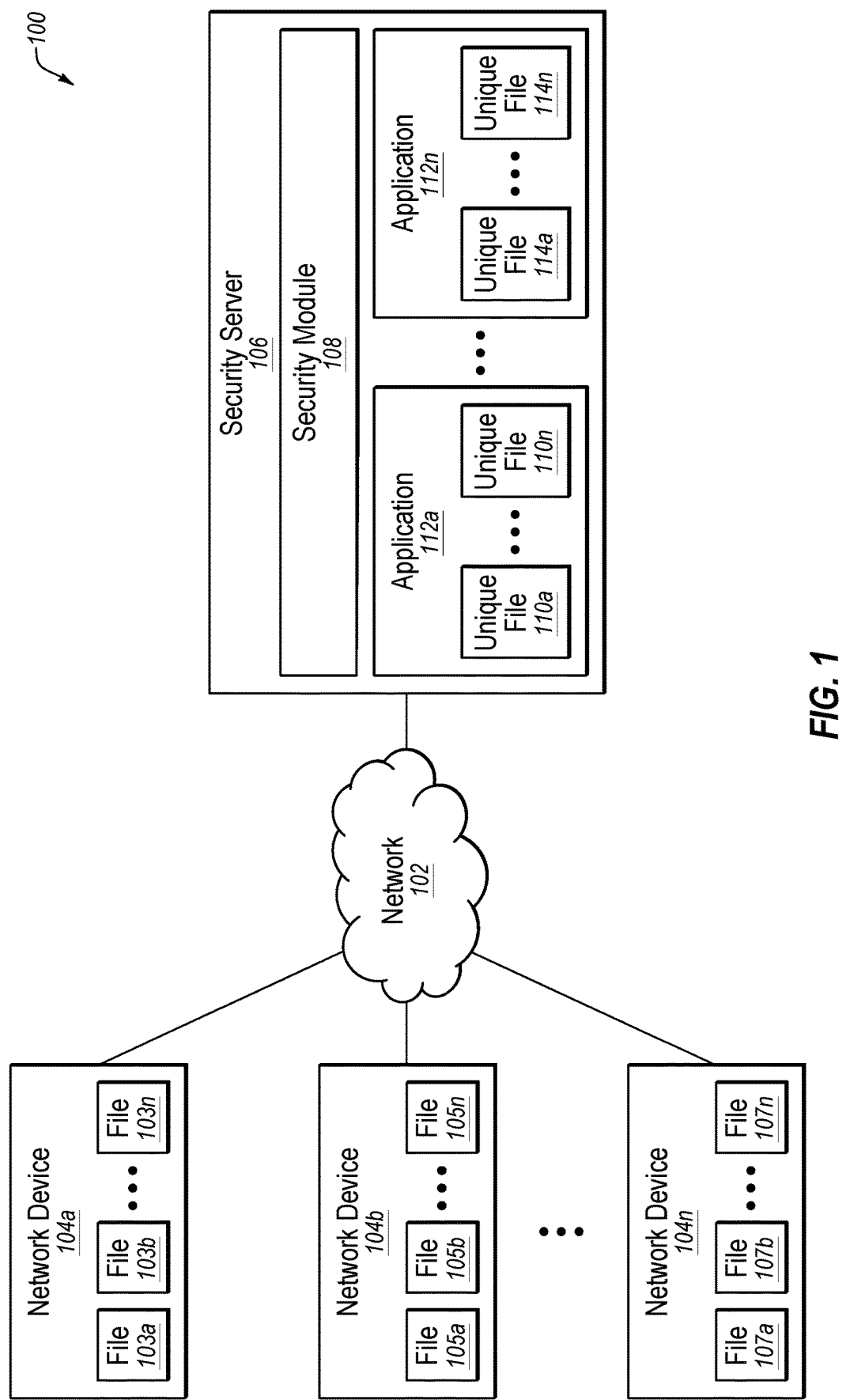
FIG. 1 illustrates an example system configured for securing a network device by automatically identifying files belonging to an application.

Turning to the figures, FIG. 1 illustrates an example system 100 configured for securing a network device by automatically identifying files belonging to an application. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
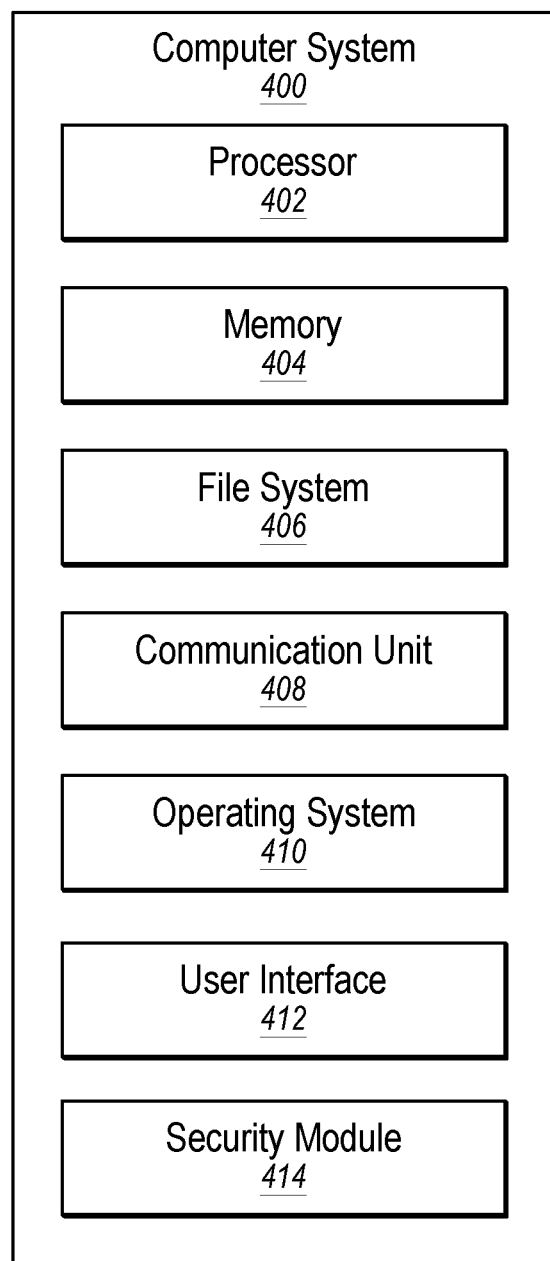
FIG. 4 illustrates an example computer system that may be employed in securing a network device by automatically identifying files belonging to an application.

In some embodiments, each of the network devices 104a-104n may be any computer system capable of communicating over the network 102, examples of which are disclosed herein in connection with the computer system 400 of FIG. 4. The network devices 104a, 104b, and 104n may store files 103a-103n, 105a-105n, and 107a-107n, respectively. Any one of these files may be a malicious file that is included in a malicious application. A malicious application may be, but is not limited to, an application that contains one or more of spyware, a virus, a worm, a logic bomb, a trapdoor, a Trojan horse, a Remote Admin Trojan (RAT), malware, mobile malicious code, a malicious font, and a rootkit.

In some embodiments, the security server 106 may be any computer system capable of communicating over the network 102 and capable of monitoring the network devices 104a-104n, examples of which are disclosed herein in connection with the computer system 400 of FIG. 4. In some embodiments, the server may include a security module 108 that may be configured to secure, over the network 102, the network device 104a-104n by automatically identifying the applications to which the files 103a-103n, 105a-105n, and 107a-107n belong, as disclosed in greater detail in connection with FIG. 3 herein. In some embodiments, the security module may identify unique files 110a-110n and 114a-114n from among the files 103a-103n, 105a-105n, and 107a-107n, and then cluster the unique files 110a-110n and 114a-114n into applications 112a-112n, as disclosed in greater detail in connection with FIG. 3 herein. In some embodiments, the security module 108 may include, or be part of, an Antivirus (AV) application (which may actually protect against forms of malicious applications beyond applications that only include a virus) or a Security Information and Event Management (SIEM) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
FIG. 2 is a chart of an example application including multiple files and multiple versions.

FIG. 2 is a chart of an example application 200 including multiple files and multiple versions. As disclosed in FIG. 2, the application 200 includes six files including three executable files with an ".exe" file extension and three dynamic-link library files with a ".dll" file extension. Each of the six files in the application 200 also have multiple versions, with the versions having seventeen different file first seen dates spanning Sep. 3, 2013 to Mar. 29, 2016. Further, the application 200 includes seven different versions spanning version v5.0 to version 5.31. Some of the versions of the application 200 include newly released versions of all six of the files of the application 200 (e.g., version v5.01 and version v5.21), while other versions of the application 200 include only some of the six files of the application 200 (e.g., version v5.0 and version v5.11).

In a scenario where the application 200 is installed as multiple files and multiple versions on a network device, such as being installed as some of the files 103a-103n on the network device 104a of FIG. 1, embodiments disclosed herein may enable a network security application, such as the security module 108 of FIG. 1, to automatically identify which of the files 103a-103n on the network device 104a belong to the application 200, as discussed below in connection with FIG. 3. This automatic identification may be accomplished dynamically, and without prior knowledge of which files are included in the application 200.

Figure 3:
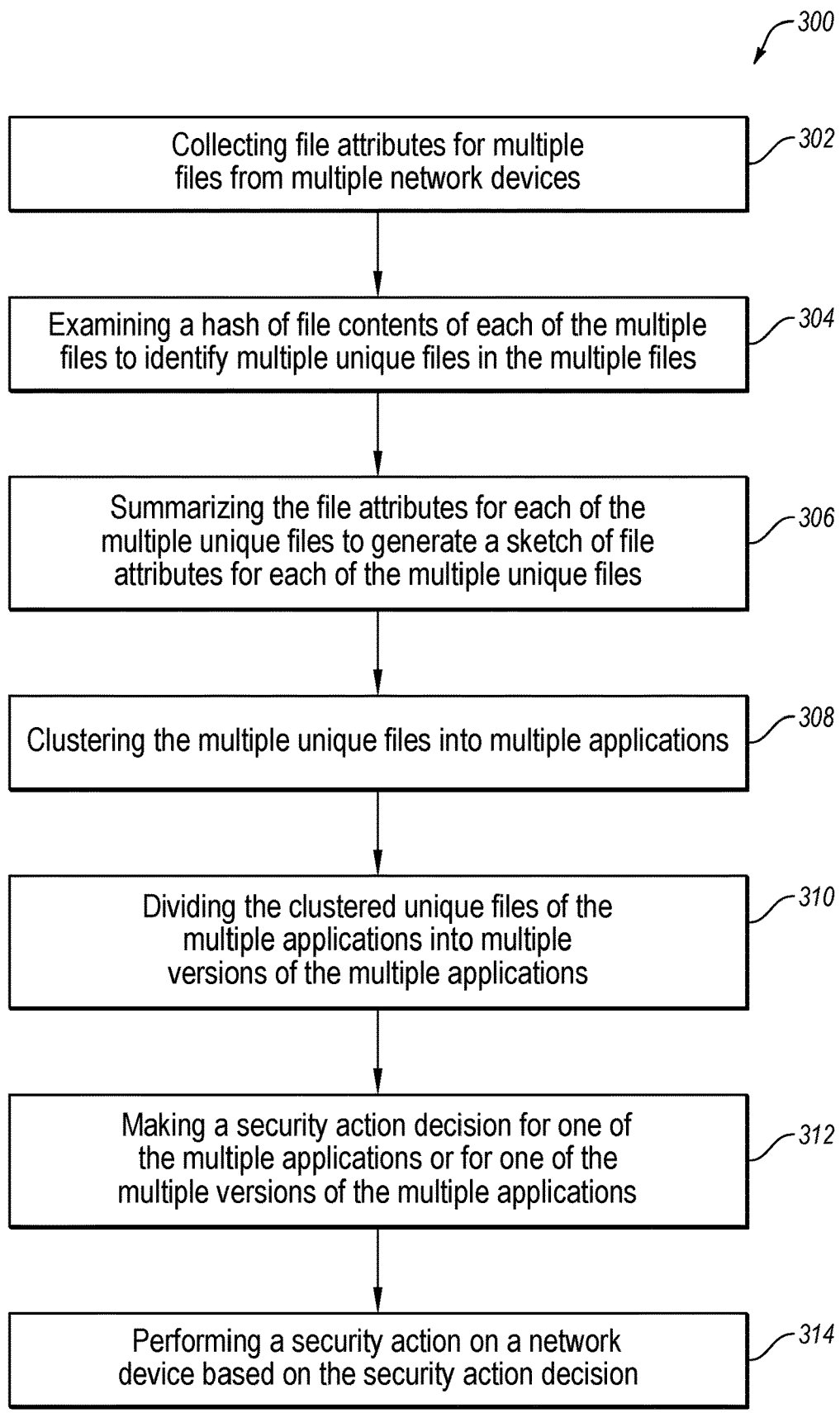
FIG. 3 is a flowchart of an example method for securing a network device by automatically identifying files belonging to an application.

FIG. 3 is a flowchart of an example method 300 for securing a network device by automatically identifying files belonging to an application. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at block 302, collecting file attributes for multiple files from multiple network devices. In some embodiments, the file attributes may include one or more of a file name, a file path, a file signer, a file first seen date, a file size, file prevalence information, and file co-occurrence information. The file attributes may further include a file-reputation report. For example, the security module 108 may collect, at block 302, file attributes for the files 103a-103n, 105a-105n, and 107a-107n that are stored on the network devices 104a, 104b, and 104n, respectively.

The method 300 may include, at block 304, examining a hash of file contents of each of the multiple files to identify multiple unique files in the multiple files. For example, the security module 108 may examine, at block 304, a hash of file contents of each of the files 103a-103n, 105a-105n, and 107a-107n to identify unique files 110a-110n and 114a-114n in the files 103a-103n, 105a-105n, and 107a-107n.

The method 300 may include, at block 306, summarizing the file attributes for each of the multiple unique files to generate a sketch of file attributes for each of the multiple unique files. In some embodiments, the summarizing of the file attributes for each of the multiple unique files may include performing a count-min sketch on the file attributes of each of the multiple unique files. For example, the security module 108 may summarize, at block 306, the file attributes for each of the unique files 110a-110n and 114a-114n to generate a sketch of file attributes for each of the unique files 110a-110n and 114a-114n. In this example, each sketch may be generated as a single finite matrix, such as an M×N matrix, that summarizes the distribution of specific file attributes, or features, of the corresponding unique file.

The method 300 may include, at block 308, clustering the multiple unique files into multiple applications. In some embodiments, the clustering, at block 308, of the multiple unique files into multiple applications may include determining a cosine similarity on sketches of the multiple unique files to cluster the multiple unique files into multiple applications. In some embodiments, the cosine similarity on the sketches may be determined by handling each sketch as a unique dimension to calculate the distance between two unique files. The similarity between two sketches may be taken as the smallest cosine similarity between each row in each sketch matrix which gives a lower bound on what the similarity may be in that dimension, with a 1 indicating that they are very similar, and with a 0 indicating that they are very dissimilar. In some embodiments, the clustering, at block 308, of the multiple unique files into multiple applications may include performing minhashing on the sketches of the multiple unique files to cluster the multiple unique files into multiple applications. In some embodiments, the minhashing of the sketching may be applied over a relatively short period of time, such as a calendar day (since application versions are not typically released multiple times in a single calendar day) in order to identify files belonging to the same package relatively quickly. Where there is an exact match on any bucket of the minhashing, it may be treated as an exact match, such that if two sketch matrices agree on any of the bucket of the minhashing, then the similarity in this dimension is 1, otherwise the similarity is 0. Alternatively a more fine-grained approach may be employed to generate similarity measures. In some embodiments, the clustering at block 308 may further include taking into account the similarities in all available different feature spaces between two unique files to determine if there is enough evidence to determine that the two unique files belong to the same application. These features may also be weighted based on importance to more accurately cluster unique files into applications. Features may include prevalence, minhash matching, signer similarity, file/directory similarity, etc., and features may have varying degrees of importance and adversarial resistance when used to cluster unique files into applications. Using different weights and criteria to create a final distance between two unique files may enable the clustering of groups of files that are highly related and part of an application.

For example, the security module 108 may cluster, at block 308, the unique files 110a-110n and 114a-114n into applications 112a-112n. Continuing with the matrix example above, if two unique files have matrices that are similar, based on cosine similarity, or minhashing for example, then the two unique files may be clustered together as part of the same application.

The method 300 may include, at block 310, dividing the clustered unique files of the multiple applications into multiple versions of the multiple applications. In some embodiments, after files have been clustered into packages, more computationally intensive operations may be performed to identify versions of the applications and to check validity of the applications. These operations may include analyzing file first seen dates, file names, files paths, file co-occurrence information, and other features to allow a grouping of files into multiple groups which represent versions of applications and to allow a mapping of file relationships through time to understand which new files are replacing which older files in an application, which files are being added or dropped in an application, etc. For example, the security module 108 may divide, at block 310, the clustered unique files 110a-110n and 114a-114n of the applications 112a-112n into multiple versions of the multiple applications 112a-112n.

The method 300 may include, at block 312, making a security action decision for one of the multiple applications or for one of the multiple versions of the multiple applications. In some embodiments, the making of the security action decision may include making a determination that the one application is likely malicious. For example, the security module 108 may make, at block 312, a security action decision for the application 112a, which may have been detected as installed on the network device 104a, and which may include making a determination that the application 112a is likely malicious.

The method 300 may include, at block 314, performing a security action on a network device based on the security action decision. In some embodiments, the performing of the security action may include one or more of at least partially blocking the one application from sending data from the network device over a network, removing the one application from the network device, or quarantining the network device on the network device. For example, the security module 108 may block, at block 314, the malicious application 112a installed on the network device 104 from sending data over the network 102.

In some embodiments, the method 300 may enable the automatic identifying of files belonging to an application in order to secure a network device. Then, a security decision and/or action may be performed on one application of the multiple applications, especially where the application is determined to be malicious. The method 300 may therefore enable a network security application to identify all files belonging to a malicious application, thus enabling the network security application to deal with the files of the malicious application collectively and more fully protect a network device on which the malicious application is installed, which leaves the network device less vulnerable to the malicious application.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, blocks 302-312 may be performed without performing block 314, or blocks 302-308 and 312 may be performed without performing blocks 310 and 314. Also, in some embodiments, block 314 may be eliminated or may be performed by a network administrator or other entity that is different from the entity performing the other blocks of the method 300. Further, in some embodiments, blocks 302-310 and blocks 312-314 may be performed in parallel with each other. Further, although the blocks of the method 300 are illustrated in FIG. 3 in the context of performing a security action, it is understood that the method 300 may also be employed in other contexts, such as in creating whitelists of clean applications or blacklists of malicious applications.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by automatically identifying files belonging to an application so that all of the files that belong to a malicious application may be dealt with collectively and may be removed or quarantined to prevent the malicious application from damaging the computer system. The method 300 may thus result in a more complete understanding of malicious applications than conventional detection methods that tend to focus on individual files instead of applications that include multiple files, which leaves networks and network devices less vulnerable to undetected files that belong to malicious applications.

Also, the method 300 may improve the technical field of detecting malicious applications and securing network devices against malicious applications. Employing a sketch of file attributes for each of the multiple unique files to more accurately cluster files into applications is an improvement over conventional attempts at determining which files belong to which applications without employing sketches.

FIG. 4 illustrates an example computer system 400 that may be employed in securing a network device by automatically identifying files belonging to an application. In some embodiments, the computer system 400 may be part of any of the systems or devices described in this disclosure. For example, the computer system 400 may be part of any of the network devices or the security server of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIG. 3. In some embodiments, the security module 414 may be part of the operating system 410 or may be part of an application of the computer system 400, or may be some combination thereof. In some embodiments, the security module 414 may function as the security module 108 of FIGS. 1 and 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for securing a network device by automatically identifying files belonging to an application, at least a portion of the method being performed by a computing device comprising at least one processor, the method comprising:
   collecting file attributes for multiple files from multiple network devices;
   examining a hash of file contents of each of the multiple files to identify multiple unique files in the multiple files;

summarizing the file attributes for each of the multiple unique files to generate a sketch of file attributes for each of the multiple unique files;

clustering the multiple unique files into multiple applications;

making a security action decision for one application of the multiple applications; and performing a security action on a network device based on the security action decision.

2. The method of claim 1, wherein the file attributes comprise one or more of a file name, a file path, a file signer, a file first seen date, a file size, file prevalence information, and file co-occurrence information.

3. The method of claim 1, wherein the summarizing of the file attributes for each of the multiple unique files comprises performing a count-min sketch on the file attributes of each of the multiple unique files.

4. The method of claim 1, wherein the clustering of the multiple unique files into multiple applications comprises determining a cosine similarity on sketches of the multiple unique files to cluster the multiple unique files into multiple applications.

5. The method of claim 4, wherein the clustering of the multiple unique files into multiple applications further comprises performing minhashing on the sketches of the multiple unique files to cluster the multiple unique files into multiple applications.

6. The method of claim 1, wherein the making of the security action decision comprises making a decision that the one application is likely malicious.

7. The method of claim 1, wherein the performing of the security action comprises at least partially blocking the one application from sending data from the network device over a network.

8. A computer-implemented method for securing a network device by automatically identifying files belonging to an application, at least a portion of the method being performed by a computing device comprising at least one processor, the method comprising:

collecting file attributes for multiple files from multiple network devices;

examining a hash of file contents of each of the multiple files to identify multiple unique files in the multiple files;

summarizing the file attributes for each of the multiple files corresponding to each of the multiple unique files to generate a sketch of file attributes for each of the multiple unique files;

clustering the multiple unique files into multiple applications;

dividing the clustered unique files of the multiple applications into multiple versions of the multiple applications;

making a security action decision for one version of the multiple versions of the multiple applications; and performing a security action on a network device based on the security action decision.

9. The method of claim 8, wherein the file attributes comprise one or more of a file name, a file path, a file signer, a file first seen date, a file size, file prevalence information, and file co-occurrence information.

10. The method of claim 8, wherein the summarizing of the file attributes for each of the multiple unique files comprises performing a count-min sketch on the file attributes of each of the multiple unique files.

11. The method of claim 8, wherein the clustering of the multiple unique files into multiple applications comprises determining a cosine similarity on sketches of the multiple unique files to cluster the multiple unique files into multiple applications.

12. The method of claim 11, wherein the clustering of the multiple unique files into multiple applications further comprises performing minhashing on the sketches of the multiple unique files to cluster the multiple unique files into multiple applications.

13. The method of claim 8, wherein the making of the security action decision comprises making a decision that the one version of the multiple applications is likely malicious.

14. The method of claim 13, wherein the performing of the security action comprises at least partially blocking the one version of the multiple applications from sending data from the network device over a network.

15. The method of claim 8, wherein the dividing of the clustered unique files of the multiple applications into the multiple versions of the multiple applications comprises dividing the clustered unique files of the multiple applications into the multiple versions of the multiple applications based on a file first seen date of the clustered unique files.

16. One or more non-transitory computer-readable media comprising one or more computer-readable instructions that, when executed by one or more processors of one or more computing devices, cause the one or more computing devices to perform a method for securing a network device by automatically identifying files belonging to an application, the method comprising:

collecting file attributes for multiple files from multiple network devices;

examining a hash of file contents of each of the multiple files to identify multiple unique files in the multiple files;

summarizing the file attributes for each of the multiple unique files to generate a sketch of file attributes for each of the multiple unique files;

clustering the multiple unique files into multiple applications;

making a security action decision for one application of the multiple applications; and performing a security action on a network device based on the security action decision.

17. The one or more non-transitory computer-readable media of claim 16, wherein:

the method further comprises dividing the clustered unique files of the multiple applications into multiple versions of the multiple applications; and the making of the security action decision for the one application of the multiple versions of the multiple applications comprises making the security action decision for one of the multiple versions of the one application.

18. The one or more non-transitory computer-readable media of claim 16, wherein:

the summarizing of the file attributes for each of the multiple unique files comprises performing a count-min sketch on the file attributes for each of the multiple unique files.

19. The one or more non-transitory computer-readable media of claim 16, wherein:

the clustering of the multiple unique files into multiple applications comprises determining a cosine similarity on sketches of the multiple unique files to cluster the multiple unique files into multiple applications; and the clustering of the multiple unique files into multiple applications further comprises performing minhashing on sketches of the multiple unique files to cluster the multiple unique files into multiple applications.

20. The one or more non-transitory computer-readable media of claim 16, wherein:
the making of the security action decision comprises making a decision that the one application is likely malicious; and
the performing of the security action comprises at least partially blocking the one application from sending data from the network device over a network.

\* \* \* \* \*